United States Patent [19]
Severinsky

[11] Patent Number: 5,440,179
[45] Date of Patent: Aug. 8, 1995

[54] UPS WITH BI-DIRECTIONAL POWER FLOW

[76] Inventor: Alex J. Severinsky, 10904 Pebble Run Dr., Silver Spring, Md. 20902

[21] Appl. No.: 51,777
[22] Filed: Apr. 26, 1993
[51] Int. Cl.⁶ .......................... H02J 7/02; H02J 9/06
[52] U.S. Cl. ....................................... 307/66; 307/64; 363/133
[58] Field of Search .......................... 307/23, 64, 65, 66, 307/85, 86, 87; 320/1, 2, 5; 363/37, 65, 56, 98, 95, 133, 132, 34

[56] References Cited

U.S. PATENT DOCUMENTS

| | | | |
|---|---|---|---|
| 4,238,690 | 12/1980 | Clarke | 307/66 |
| 4,277,692 | 7/1981 | Small | 307/66 |
| 4,916,329 | 4/1990 | Dang et al. | 307/66 |
| 5,010,469 | 4/1991 | Bobry | 307/87 |

Primary Examiner—Jeffrey A. Gaffin
Assistant Examiner—Peter Ganjoo
Attorney, Agent, or Firm—Banner, Birch, McKie & Beckett

[57] ABSTRACT

AS uninterruptible power supply (UPS) is disclosed in which AC line power is used to charge back-up battery and to operate a load during a stand-by mode of operation of the UPS. In the back-up mode of operation when AC line power is not available, the battery is used to supply power to the load. The UPS is implemented with only one inexpensive high frequency transformer and a single bi-directional power converter. Thus, the UPS of the present invention is lower in cost and complexity than such UPSs known in the prior art.

11 Claims, 7 Drawing Sheets

INPUT VOLTAGE WAVEFORM

FIG. 7B

OUTPUT VOLTAGE WAVEFORM

UPS WITH BI-DIRECTIONAL POWER FLOW

BACKGROUND OF THE INVENTION

The present invention generally relates to the field of standby alternating current uninterruptible power supplies. More particularly, the invention is directed to an uninterruptible power supply (UPS) in which AC line power is used to operate a load and to charge a stand-by battery during a stand-by mode of operation of the UPS. When AC line power is not available and the UPS is operating in a back-up mode, the battery is used to supply power to the load.

The present invention differs from prior art UPSs in a number of ways, including the use of a single light weight, low cost, high frequency fly-back transformer in the power converter rather than the approach taken by prior art UPSs which rely on low (power line) frequency transformers. Low frequency transformers are heavy and more expensive than high frequency transformers.

There are numerous examples in the prior art of the use of low frequency transformers in stand-by uninterruptible power supplies. Such power supplies are described in U.S. Pat. Nos. 5,010,469; 4,916,329; 4,827,150 and 4,728,808. The disadvantages of the UPSs described in the foregoing patents include the use of a low frequency transformer, which as pointed out above, is large and expensive, in comparison with the remainder of the power supply circuitry.

U.S. Pat. No. 4,634,888, issued in the name of Deavenport, describes a UPS in which a pair of high frequency transformers are used. One transformer, together with its power converter, is used to charge the battery during stand-by operation. The second transformer, together with its power converter, is used to discharge the same battery for operating a load during back-up operation. The need for two power transformers and two corresponding power converters make the UPS described by the Deavenport patent expensive and overly complex to manufacture in comparison with the UPS of the present invention.

U.S. Pat. No. 4,277,692, issued in the name of Small, describes a UPS which uses a bi-directional power converter operating along with a low frequency push-pull transformer and common mode choke. While such a power supply is lower in cost than the Deavenport UPS, the use of a choke and low frequency transformer still adds to the cost and wight of the UPS.

SUMMARY OF THE INVENTION

It is, therefor, the overall object of the present invention to provide an uninterruptible power supply which overcomes the drawbacks and disadvantages of uninterruptible power supplies know in the prior art.

The invention provides an uninterruptible power supply in which AC line power is used to charge the battery and to operate a load during the stand-by mode of operation of the UPS. In the back-up mode of operation when AC line power is not available, the battery is used to supply power to the load. The UPS is implemented with only one inexpensive high frequency transformer and a single bi-directional power converter. Thus, the UPS of the present invention is lower in cost and complexity than such UPSs known in the prior art.

The above-mentioned and other objects and features of the present invention will become apparent from the following description read in conjunction with the accompanying drawings.

DESCRIPTION OF THE PREFERRED EMBODIMENT

The present invention will now be described with reference to the accompanying drawings.

Figure 1:
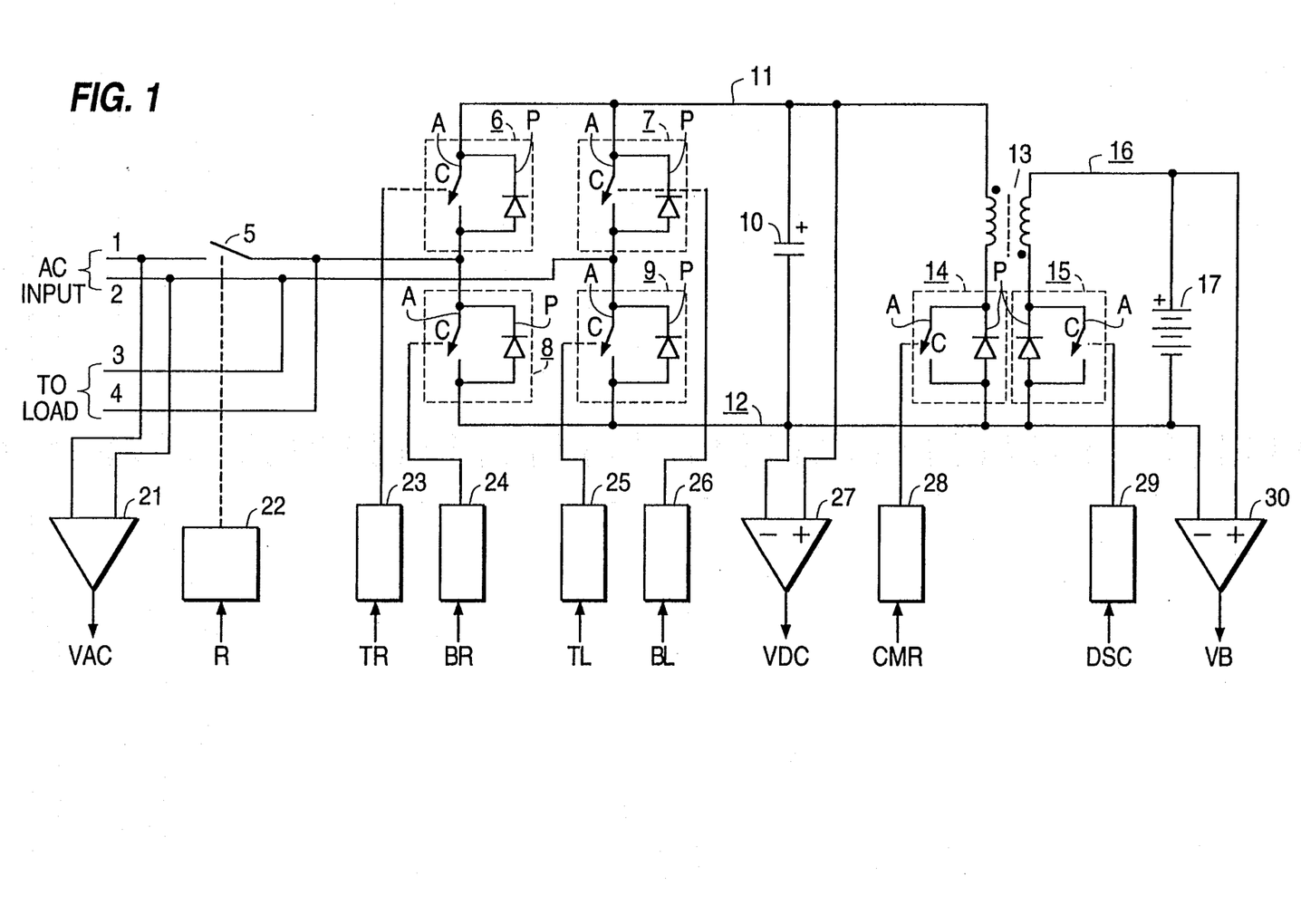
FIG. 1 is a schematic diagram of a UPS illustrating the bi-directional power flow circuits and sensing circuit conditioners in accordance with the present invention.

With reference to FIG. 1, the UPS of the present invention includes a pair of input terminals 1 and 2 for connecting the UPS to an external source of AC line power and a pair of output terminals 3 and 4 for connecting AC power produced by the UPS when AC line power is not available. Terminals 1 and 2 are connected to the AC line power source by electrical conductors. Terminals 3 and 4 are connected to the load by electrical conductors through the contacts of relay 5.

The contacts of relay 5 normally are CLOSED, thus connecting terminal 1 from the AC power line input to output load terminal 4. The contacts of relay 5 are shown in the OPEN position in FIG. 1 merely to clarify the operation of the UPS in the back-up mode. Terminal 2 from the AC power line input is connected directly to output load terminal 3.

The UPS also includes a full bridge inverter with feedback diodes. The inverter is formed of semiconductor switch devices 6, 7, 8 and 9. Each switch device is formed of a pair of semiconductor devices connected in parallel, i.e., an active controllable semiconductor switch labeled "A" with a control electrode labeled "C" and a passive semiconductor diode labeled "P". Active semiconductor switch "A" conducts current only in one direction and passive diode "P" conducts current in the opposite direction.

The types of semiconductors which can be used to form active semiconductor switch "A" include junction transistors, GTOs, IGBTs and MOSFETs. If MOSFETs are used, there is no need for passive diode "P" as MOSFETs have an internal intrinsic diode as part of their semiconductor structure.

The semiconductor switch devices are interconnected in the same manner as a rectifier bridge with positive polarity on conductor 11 and a negative polarity on conductor 12 as illustrated in FIG. 1. Load terminals 3 and 4 are connected to the input of the bridge as also shown in FIG. 1. Switch device 6 is connected between positive potential conductor 11 and load terminal 4. The cathode of diode "P" of switch device 6 also is connected to conductor 11. Switch device 7 is connected between positive potential conductor 11 and load terminal 3. The cathode of diode "P" of switch device 7 also is connected to conductor 11. Switch device 8 is connected between negative potential conductor 12 and load terminal 4. The anode of diode "P" of switch device 8 also is connected to conductor 12. Switch device 9 is connected between negative potential conductor 12 and load terminal 3. The anode of diode "P" of switch device 9 also is connected to conductor 12. A storage filter capacitor 10 is connected between conductors 11 and 12.

A bi-directional flyback power converter connects capacitor 10 to back-up battery 17. Other topology converters can be used as a function of required back-up power of the UPS. Other such topologies include a buck converter, boost converter, buck-boost converter, half-bridge converter, push-pull converter, full bridge converter and a Cuk converter, all of which are known in the prior art. In all of the aforementioned converters, the switching devices are arranged in the same manner as semiconductor switch devices 6 through 9, the operation of which will be explained below with reference to flyback type of converter shown in FIG. 1. A flyback converter is used merely to describe the basic operation of the present invention. The description also applies to the other such converters mentioned above.

The flyback transformer 13 of the converter includes two winding connected to the remainder of the circuit. As shown in FIG. 1, the beginning of one winding is connected to conductor 11 and the end of the other winding is connected to conductor 16. Conductor 16 is connected to the positive terminal of battery 17. The other ends of transformer 13 are connected to a second set of semiconductor switch devices 14 and 15. These switch devices are formed in a similar manner as semiconductor switch devices 6 through 9. Thus, each of switch devices 14 and 15 is formed of a pair of semiconductor devices connected in parallel, i.e., an active controllable semiconductor switch labeled "A" with a control electrode labeled "C" and a passive semiconductor diode labeled "P". The cathodes of diodes "P" are connected to the other ends of the windings of transformer 13.

The anode of diode "P" of switch device 14 is connected to the negative potential conductor 12 and the anode of diode "P" of switch device 15 is connected to the negative terminal of battery 17.

In the embodiment of the invention shown in FIG. 1, negative potential conductor 12 is connected to the negative terminal of battery 17. Alternatively, however, negative potential conductor 12 can be separated from the negative terminal of battery 17 in order to provide full isolation between the battery circuitry and the AC circuitry.

Control terminals "C" of switch devices 14 and 15 turn active devices "A" ON and OFF and permit or prevent current flow through the devices in the direction opposite to the flow of current in the associated diode "P".

Each of semiconductor switch devices 6-7, 14 and 15 have a corresponding driver circuit connected to terminal "C" of the switch device. The drivers provides the required power, isolation and level shifting necessary to operate terminal "C". Each driver also has an input which is compatible with common control logic level and operating voltages as are known in the art.

Driver 23, with its input TR, is connected to terminal "C" of switch device 6. Driver 24, with its input BR, and driver 26, with its input BL, are connected to respective terminals "C" of switch devices 8 and 7. Driver 24 can, however, be simplified if the common logic level is equal to the potential of negative conductor 12. If this is the case, there will be no need for driver 24 to provide isolation. Driver 25, with its input TL, and driver 28, with its input CHR, are connected to respective terminals "C" of switch devices 9 and 14. Driver 28 differs only in the control signals delivered to switching device 14 versus switching device 8. Driver 29 is connected to device 15 and is similar in function to driver 28 in the embodiment where the negative terminal of battery 17 is connected to conductor 12. Driver 29 is similar in function to driver 23 when in the embodiment where battery 17 is isolated from conductor 12. The differences are only in the control signals required by their appropriate devices. There are numerous driver circuits in the art which can perform any of the above described functions.

Relay 5 is controlled by driver 22 with input R. Driver 22 provides the required power for the relay coil in order to CLOSE or OPEN the relay contacts upon application of a digital logic voltage level to input R.

Feedback signal conditioners 27, 30 and 21 also are provided. Conditioner 21 provides a signal referenced to the logic common conductor and is linearly proportional to the input AC voltage across terminals 1 and 2. Differential amplifiers can be used to provide this function. Conditioner 27 is similar to conditioner 21 and provides a signal which is proportional to the DC voltage across capacitor 10. Conditioner 30 also is similar to conditioner 21 and provides a signal which is proportional to the voltage on battery 17. Conditioners 27, 30 and 21 can be designed with or without level shifting as required by the design of the control logic. There are numerous circuits known in the art which cab be utilized for signal conditioning provided by conditioners 27, 30 and 21.

Figure 2:
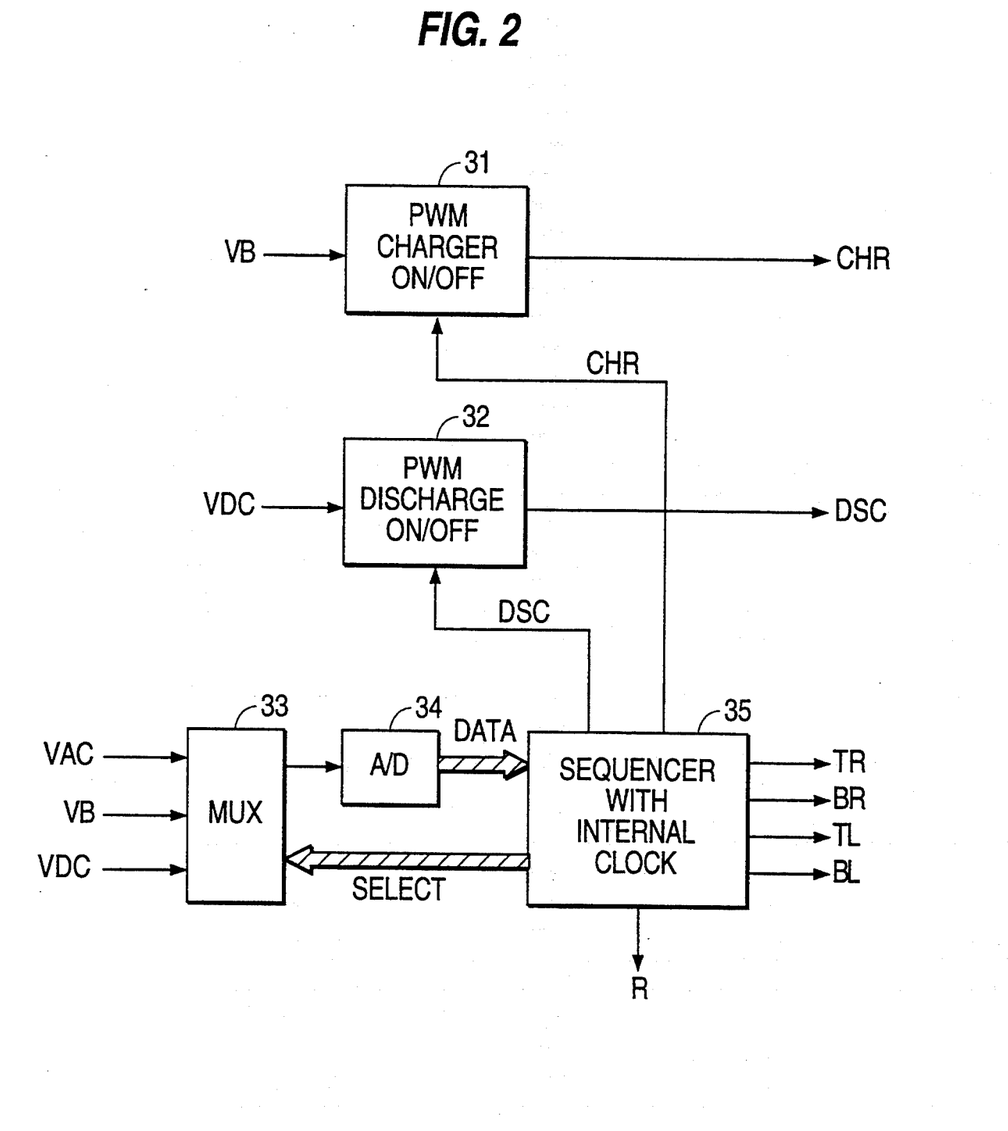
FIG. 2 is a block diagram of the logic control circuits for the UPS of the present invention illustrating the charge and discharge control circuits.

As shown in FIG. 2, a first pulse width modulation (PWM) circuit 31 receives a feedback voltage from conditioner 30 and provides a series of pulses to driver 28. PWM circuit 31 also has a digital on/off input which is driven by sequencer 35 discussed below which enables and disables the operation of the circuit. PWM circuit 31 provides variable duty cycle pulses on its output as a function of the level of the feedback voltage on its input from conditioner 30. There are numerous voltage or current controlled PWM circuits known in the art which can be used to provide the function of PWM circuit 31. Many of such circuits are integrated on a semiconductor chip.

A second PWM circuit 32 receives feedback voltage from conditioner 27 and provides a series of pulses to driver 29. Circuit 32 also has a digital on/off input which is driven by sequencer 35 and functions in the same manner as PWM circuit 31.

Multiplexer circuit 33 receives three analog signals VAC, VB and VDC from conditioners 21, 27 and 30. Multiplexer 33 also has a digital select input which is controlled by sequencer 35. The output of multiplexer 33 is supplied to A/D converter 34. The digital output from A/D converter 34 is supplied to the input of sequencer 35.

Sequencer 35 can be implemented by a microcomputer based circuit, as is known in the art. Sequencer 35 receives the digital input from A/D converter 34 and provides ON/OFF outputs to drivers 22, 23, 24, 25, 26 and PWM circuits 31 and 32.

OPERATION OF THE UPS

Stand-by Mode of Operation

Figure 7A:
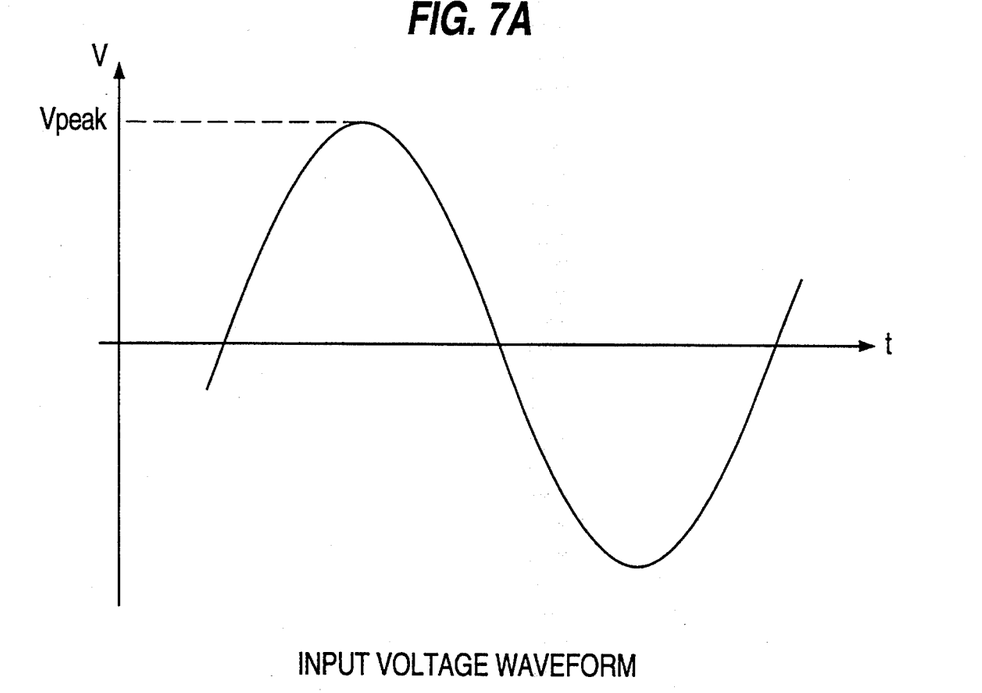
FIGS. 7a and 7b illustrates the input and output voltage waveform of the UPS shown in FIG. 1.

In the stand-by mode of operation of the UPS, AC sinewave voltage from, for example, the electric utility, is applied across input terminals 1 and 2. Such a sinewave voltage is shown in FIG. 7A.

Figure 5:
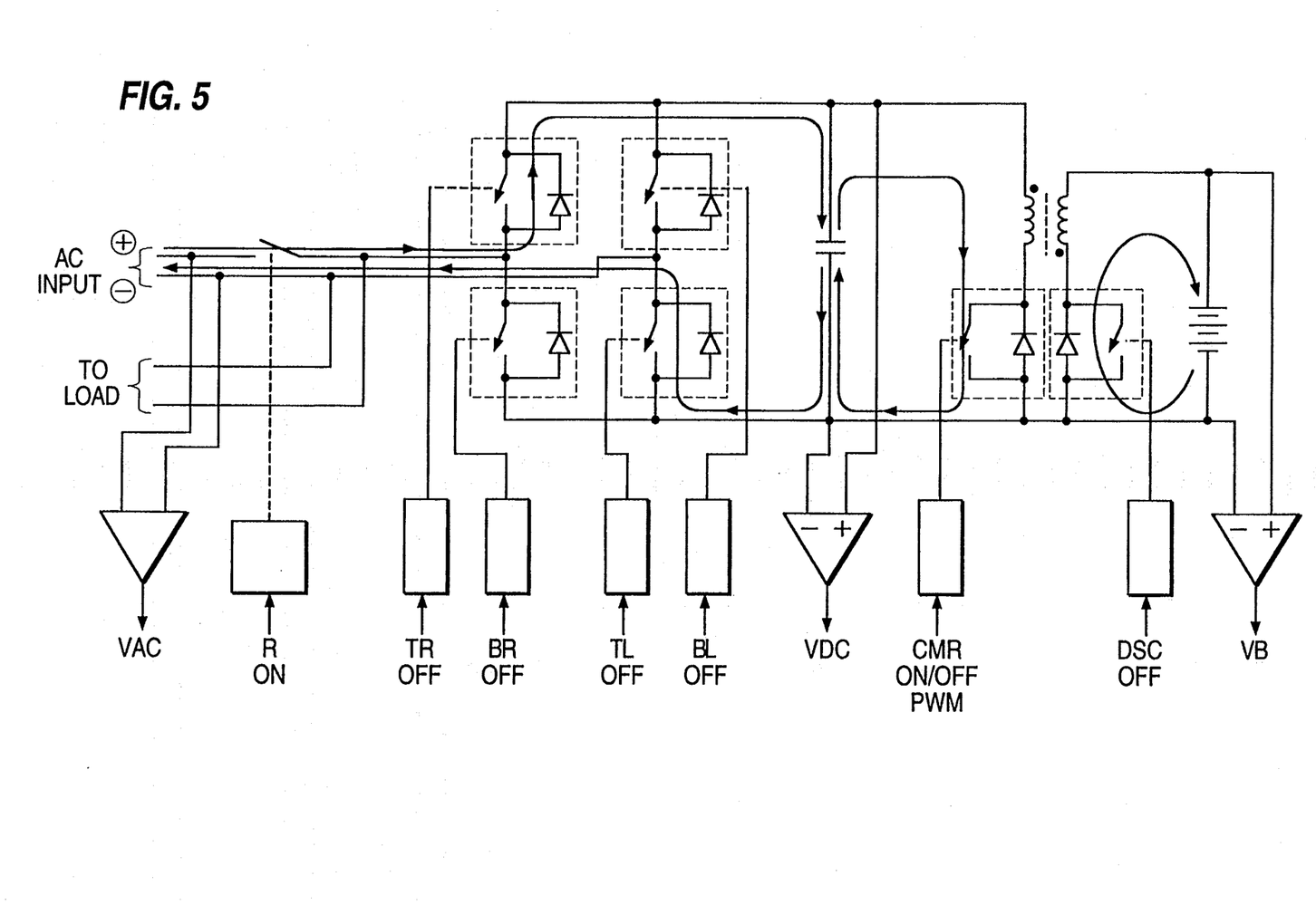
FIG. 5 is another schematic diagram of the UPS shown in FIG. 1 illustrating the flow of current during the charge or standby mode of operation of the UPS during a positive half wave of the output voltage waveform.

When the contacts of relay 5 are in the CLOSED state, load terminals 3 and 4 are connected in parallel with input terminals 1 and 2 via the contacts. Thus, AC power is provided to the load from the input AC power source. In the present state, the status of the outputs of sequencer 35 are as follows:
Relay 5 Contacts—CLOSED
Outputs Of Drivers 23, 24, 25 and 26—OFF
Output of PWM Circuit 32—OFF
Output of PWM Circuit 31—ON
Positive Half Cycle of Input AC Waveform FIG. 5 illustrates the flow of current during the positive half of the input AC power voltage. During the positive half cycle, electrical current supplied by the input power source flows from positive input AC power terminal 1 through diode "P" of semiconductor device 6 to capacitor 10. The current then flows through diode "P" of semiconductor device 9 to negative input AC power terminal 2. This current charges capacitor 10 until the voltage across the capacitor reaches the peak voltage across terminals 1 and 2.

PWM circuit 31 receives a feedback signal from battery 17 via conditioner 30 and provides a series of pulses to driver 28 in order to operate the active semiconductor "A" of semiconductor switch 14. At one level of the pulses from PWM circuit 31, active semiconductor "A" of semiconductor switch 14 conducts current in such a way that capacitor 10 is discharged via the primary winding of transformer 13, thus providing magnetic energy to transformer 13. At the other level of the pulses from PWM circuit 31, active semiconductor "A" of semiconductor switch 14 does not conduct current, thus allowing the accumulated magnetic energy to discharge via the secondary winding of transformer 13 into battery 17 through diode "P" of semiconductor switch 15. This is the operation of a flyback converter. Battery 17 charges during this operation and, therefore, PWM circuit 31 is referred to as a charger. PWM circuit 31 regulates the duty cycle of the pulses in such a way that the continuous float voltage on battery 17 is regulated accordingly at the desired value. The frequency of the pulses from PWM circuit 31 is several orders of magnitude higher than the frequency of the voltage from the input AC power line.

Figure 6:
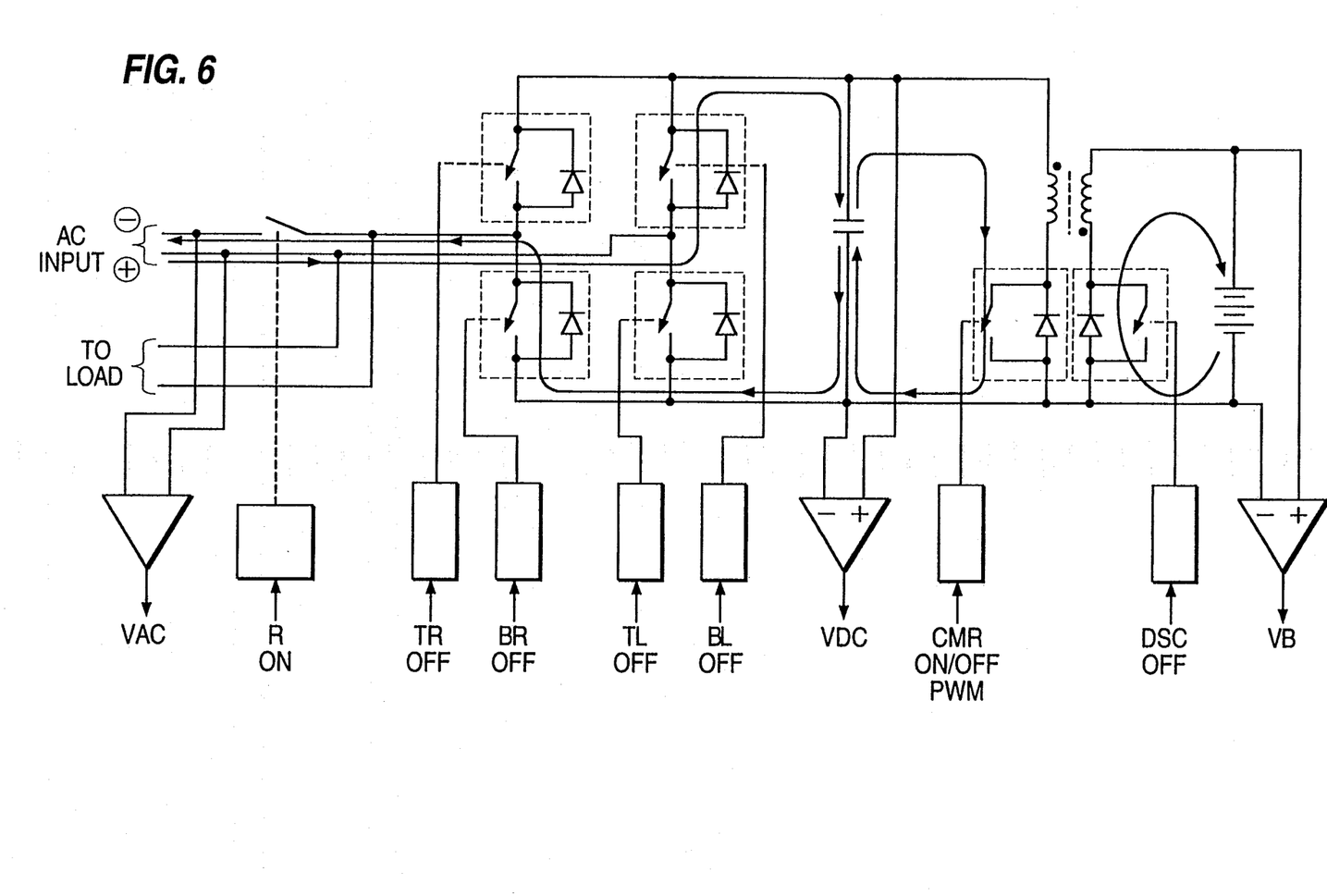
FIG. 6 is another schematic diagram of the UPS shown in FIG. 1 illustrating the flow of current during the charge or standby mode of operation during a negative half wave of the output voltage waveform.

Negative Half Cycle of Input AC Waveform (FIG. 6)

During the negative half cycle of the AC waveform, electrical current supplied by the input AC power source flows from positive AC input terminal 2 through diode "P" of semiconductor switch 7 to capacitor 10. The current then flows through diode "P" of semiconductor switch 8 to negative AC input terminal 1. This current charges capacitor 10 until the voltage on capacitor 10 reaches the peak voltage across AC input terminals 1 and 2. The remainder of the circuit operates in the same manner as described above with respect to the positive half cycle of the AC waveform.

Back-Up Mode of Operation

Figure 7B:
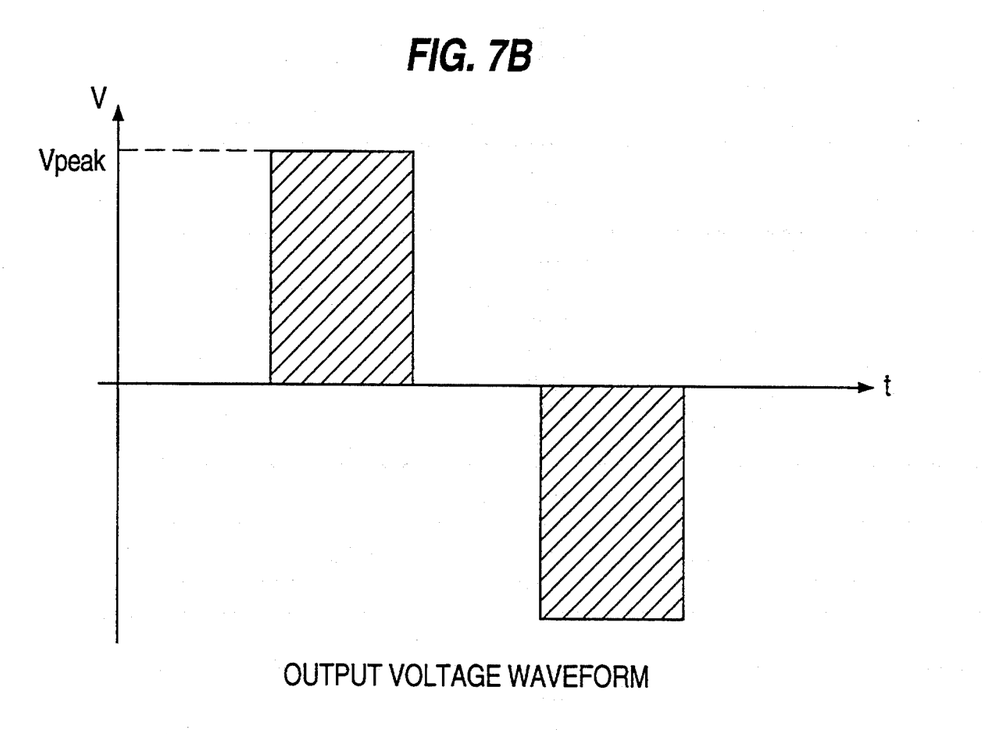

During the back-up mode of operation, AC voltage is applied by the UPS to the load via load terminals 2 and 4. FIG. 7B represents a typical waveform of the voltage supplied by the UPS.

Figure 3:
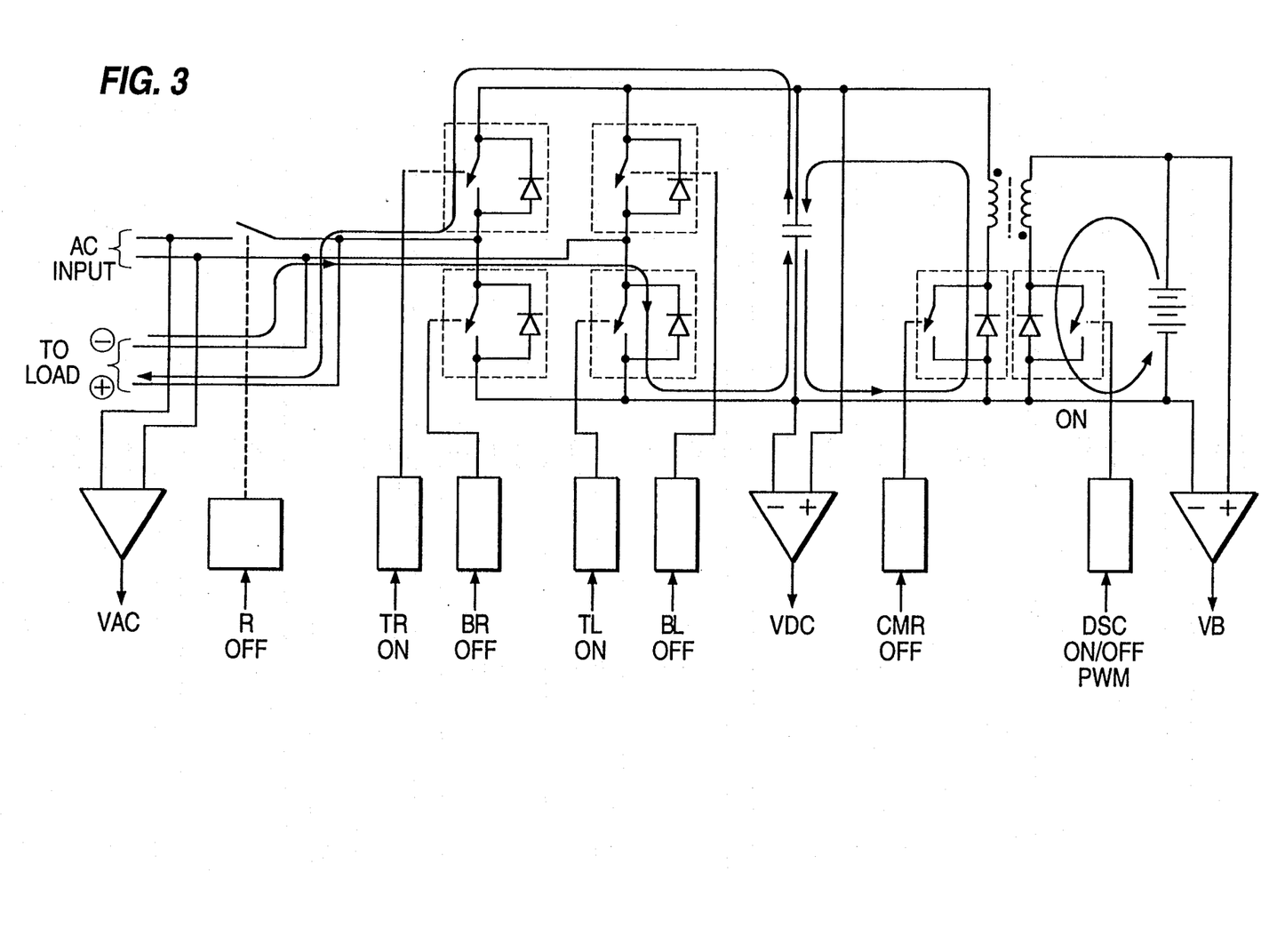
FIG. 3 is another schematic diagram of the UPS shown in FIG. 1 illustrating the flow of current during the discharge or back-up mode of operation of the UPS during a positive half wave of the output voltage waveform.

During the back-up mode, the contacts of the relay 5 are OPEN. Thus, no power is supplied to the load by the input AC power source. The status of the outputs of sequencer 35 are as follows:
Relay 5 Contacts—OPEN
Outputs Of Drivers 23, 24, 25 and 26—ON or OFF
Output of PWM Circuit 32—ON
Output of PWM Circuit 31—OFF
Positive Half Cycle of Load AC Waveform (FIG. 3)

During the positive half cycle of the UPS, sequencer 35 turns ON active semiconductors "A" in semiconductor switch devices 6 and 9 and maintains OFF active semiconductors "A" in semiconductor switch devices 7 and 8.

Electrical current is supplied to the load from the UPS and flows to positive terminal 4 through active semiconductor "A" of semiconductor switch device 6 from capacitor 10. The current then flows from negative terminal 2 via active semiconductor "A" of semiconductor switch device 9 back to capacitor 10. This current flow discharges capacitor 10 using the load current.

PWM circuit 32 receives a feedback signal from capacitor 10 via conditioner 27 and provides a series of pulses to driver 29 which operates active semiconductor "A" of semiconductor switch device 15. At one level of the pulses from PWM circuit 32, active semiconductor "A" of semiconductor switch device 15 conducts current is such a way that battery 17 is discharged via the secondary winding of transformer 13 providing magnetic energy to transformer 13. At the other level of the pulses from PWM circuit 32, active semiconductor "A" of semiconductor switch device 15 does not conduct current and allows the accumulated magnetic energy to discharge via the primary winding of transformer 13 into capacitor 10 thought diode "P" of semiconductor switching device 14. The is also the operation of a fly-back converter. Battery 17 discharges and thus PWM circuit 32 is referred to as a discharger. PWM circuit 32 regulates the duty cycle of the pulses in such a manner that the continuous voltage on capacitor 10 is regulated at the desired value. The frequency of the pulses from PWM circuit 32 is several orders of magnitude higher than the frequency of the AC voltage from the input power line.

As the output peak voltage on the load is equal to the regulated voltage on capacitor 10, the output peak voltage is regulated as well, short of the internal impedance of semiconductor switch devices 6 and 9.

Figure 4:
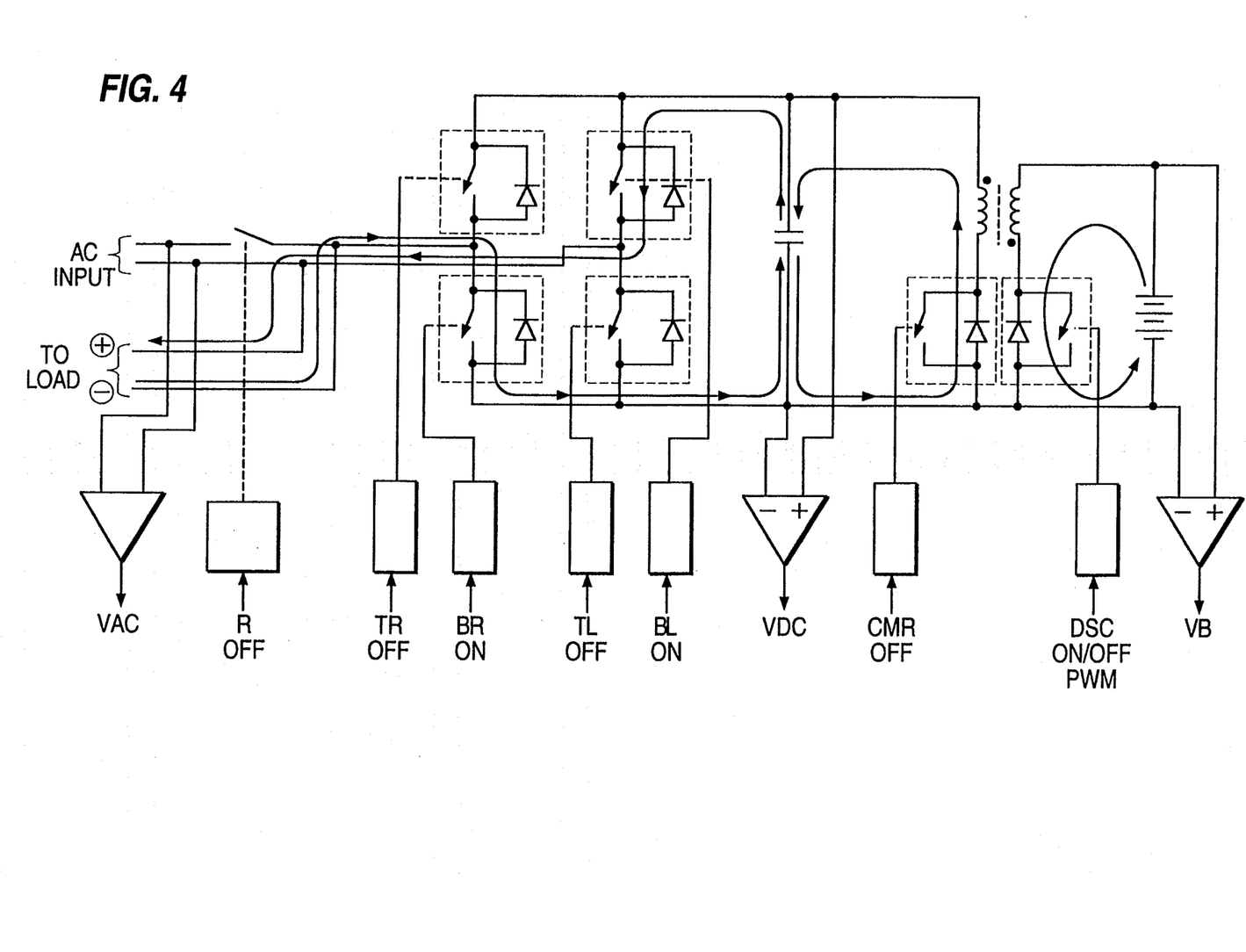
FIG. 4 is another schematic diagram of the UPS shown in FIG. 1 illustrating flow of current during the discharge or back-up mode of operation of the UPS during a negative half wave of the output voltage waveform.

Negative Half Cycle of The Load AC Waveform (FIG. 4)

During the negative half cycle, sequencer 35 turns ON active semiconductors "A" of semiconductor switch devices 7 and 8 and keeps OFF active semiconductors "A" of semiconductor switch devices 6 and 9. Electrical current flows to the load from capacitor 10 via positive terminal 3 through active semiconductor "A" of semiconductor switch 7. Current then flows from negative terminal 4 via active semiconductor "A" of semiconductor switch 8 to capacitor 10. This current flow discharges capacitor 10 with the load current. The remainder of the circuit operates in the same manner as described above with respect to the positive half cycle during the stand-by mode of operation.

Transitions

Stand-by to Back-Up

During the transition from stand-by to back-up mode, the initial state of the sequencer 35 output is as follows:
Relay 5 Contacts—CLOSED
Outputs Of Drivers 23, 24, 25 and 26—OFF
Output of PWM Circuit 32—OFF
Output of PWM Circuit 31—ON Sequencer 35 selects inputs from conditioner 21 via multiplexer 33 as frequently as desired to sample by A/D converter 34. This is the input power voltage waveform. The sequencer receives a digital representation of the current value of this AC voltage and compares it with boundary values set for this particular phase of the waveform. If this voltage is outside of this set boundary, sequencer 35 changes its output as described above with respect to the back-up mode of operation as a function of the polarity of the input voltage waveform, positive or negative.

Sequencer 35 derives the frequency of the voltage waveform from its zero crossing points and synchronizes its internal reference boundaries to such zero crossings. The waveform of the output voltage at the beginning of the back-up operation will start in the same phase relationship as the phase at which the input voltage was determined to be outside of the allowed boundaries.

The sequencer also can monitor the battery voltage via conditioner 30 and multiplexer 33. By comparing data representing the level of the battery voltage with a set reference voltage, sequencer 35 can block a transition from the stand-by to the backup mode of operation if the battery is not sufficiently charged to carry the load during the back-up mode.

Transitions In Back-up Voltage Waveforms

Sequencer 35 places active semiconductors "A" in semiconductor switch devices 6–9 in two states as described above with respect to the operation during the positive and negative half cycles. In between the positive and negative half cycles, i.e., when the output voltage is maintained at a zero level, sequencer 35 maintains either the active semiconductors "A" in semiconductors switch devices 6 and 7 in the ON state and the active semiconductors "A" in semiconductors switch devices 8 and 9 in an OFF state, and vice versa. The changeover timing is defined by an internal sequence timer which provides a time base generally at the periodicity of the power line, for example, 50, 60 or 400 Hz.

Transition from Back-up to Stand-by

During the transition from back-up to stand-by, the initial state of the outputs of sequencer 35 are as follows:
Relay 5 Contacts—OPEN
Outputs Of Drivers 23, 24, 25 and 26—ON or OFF
Output of PWM Circuit 32—ON
Output of PWM Circuit 31—OFF Sequencer 35 selects inputs from conditioner 21 via multiplexer 32 as frequently as desired to be sampled by A/D converter 34. This is the input power voltage waveform. The sequencer receives a digital representation of the current value of this AC voltage and compares it with boundary values set for this particular phase of the waveform. If this voltage is inside of this set boundary, the sequencer changes its output as described above with respect to the stand-by mode of operation. Sequencer 35 derives the frequency of the voltage waveform from its zero crossing points and synchronizes its internal reference boundaries to such zero crossings. The transition usually will be selected to take place around this zero crossing point to introduce a minimum of distortions.

Additional functions of the sequencer can include monitoring the battery voltage via conditioner 30 and multiplexer 33. By comparing data representing the level of the battery voltage with an internal reference voltage, sequencer 35 can stop the back-up operation when the battery is close to being discharged.

Another function of the sequencer includes monitoring the voltage across capacitor 10 via conditioner 27 and multiplexer 33. By comparing data representing the level of the voltage across capacitor 10 with an internal reference voltage, sequencer 35 can stop the back-up operation if this voltage is outside of determined boundaries due either to overload or feedback of energy by the load.

In the embodiment of the power inverter described above, sequencer 35 produces a stepped wave voltage. It is know in the prior art to add a filter to the inverter and PWM controller to produce any shape waveform, including a sinewave. The only function of sequencer 35 would then be to provide a phase reference to the PWM circuit and turning it ON and OFF during transitions.

The present invention has been illustrated and described in detail in the drawings and foregoing description, it will be recognized that changes and modifications will occur to those skilled in the art. It is therefore intended, by the appended claims, to cover any such changes and modifications as fall within the true spirit and scope of the invention.

I claim:

1. An uninterruptible power supply having a stand-by mode of operation and a back-up mode of operation, said power supply comprising:
   input means for receiving input AC power from an AC power source;
   output means for providing AC power to a load;
   AC power switch means coupled to said input means and to said output means for switchably coupling said input AC power to said load during said stand-by mode;
   inverter means coupled to said input means, said output means and to a storage capacitor for receiving said input AC power to charge said storage capacitor during said stand-by mode and to provide AC power to said load from the charge stored in said storage capacitor during said back-up mode;
   converter means coupled to said storage capacitor and to a battery for charging said battery with energy stored in said storage capacitor during said stand-by mode and charging said storage capacitor with energy stored in said battery during said back-up mode; and
   control means coupled to said AC power switch means, said inverter means and said converter means for controlling the operating modes of said power supply.

2. An uninterruptible power supply according to claim 1, wherein said converter means includes transformer means for transferring energy between said storage capacitor and said battery.

3. An uninterruptible power supply according to claim 2, wherein said storage capacitor is coupled to a first winding of said transformer means through first switch means for controlling the flow of current through said first winding, said battery is coupled to a second winding of said transformer means through second switch means for controlling the flow of current through said second winding, said first and second switch means being controlled by said control means in accordance with the operating mode of said power supply.

4. An uninterruptible power supply according to claim 1, wherein said inverter means is formed of a plurality of switch means, each switch means having first and second switch elements connected in parallel, said first switch element having a control gate for controlling the flow of current through said first switch element, said control gate being controlled by said control means.

5. An uninterruptible power supply according to claim 3, wherein said control means further includes first pulse width modulation means for generating a series of first control pulses for controlling the operation of said first switch means, said first pulse width modulation means being coupled to said battery, wherein the duty cycle of said first control pulses is dependent on the level of voltage across said battery.

6. An uninterruptible power supply according to claim 5, wherein said control means further includes second pulse width modulation means for generating a series of second control pulses for controlling the operation of said second switch means, said second pulse width modulation means being coupled to said storage capacitor, wherein the duty cycle of said second control pulses is dependent on the level of voltage across said storage capacitor.

7. An uninterruptible power supply according to claim 5, wherein said control means further includes pulse width modulation means for generating a series of control pulses for controlling the operation of said second switch means, said pulse width modulation means being coupled to said battery, wherein the duty cycle of said control pulses is dependent on the level of voltage across said battery.

8. An uninterruptible power supply according to claim 7, wherein said control means further includes sequencer means for enabling and disabling said first and second pulse width modulation means in accordance with the level of the AC input voltage, the voltage across said battery and the voltage across said storage capacitor.

9. An uninterruptible power supply according to claim 8, wherein sequencer means further controls the operation of said inverter means in accordance with the level of the AC input voltage, the voltage across said battery and the voltage across said storage capacitor.

10. An uninterruptible power supply according to claim 9, wherein said control means includes A/D converter means coupled to said input means for converting the voltage level of said input AC power to a corresponding digital signal, said digital signal being used by said sequencer means to control the operation of said first and second pulse width modulation means and said inverter means.

11. An uninterruptible power supply according to claim 9, wherein sequencer means further controls the operation of said AC power switch means.

* * * * *

REEXAMINATION CERTIFICATE (4791st)

United States Patent
Severinsky (10) Number: US 5,440,179 C1
(45) Certificate Issued: Jun. 3, 2003

(54) UPS WITH BI-DIRECTIONAL POWER FLOW

(75) Inventor: Alex J. Severinsky, Silver Spring, MD (US)

(73) Assignee: SL Waber, Inc., Mt. Laurel, NJ (US)

Reexamination Request:
No. 90/005,039, Jul. 14, 1998
No. 90/005,647, Feb. 28, 2000

Reexamination Certificate for:
Patent No.: 5,440,179
Issued: Aug. 8, 1995
Appl. No.: 08/051,777
Filed: Apr. 26, 1993

(51) Int. Cl.$^7$ .................. H02J 7/02; H02J 9/06
(52) U.S. Cl. .................. 307/66; 307/64; 363/133
(58) Field of Search .................. 307/23, 29, 43, 307/46, 64–66, 85–87; 363/34, 37, 56, 65, 95, 98, 132, 133; 320/103, 124, 127, 128, 134, 137, 140, 166

(56) References Cited

U.S. PATENT DOCUMENTS

| | | | |
|---|---|---|---|
| 4,065,711 A | | 12/1977 | Kawabata .................. 320/14 |
| 4,277,692 A | | 7/1981 | Small .................. 307/66 |
| 4,391,598 A | * | 7/1983 | Thompson .................. 604/65 |
| 4,400,624 A | | 8/1983 | Ebert .................. 307/43 |
| 4,442,713 A | * | 4/1984 | Wilson et al. .................. 73/599 |
| 4,499,479 A | * | 2/1985 | Lee et al. .................. 346/140 R |
| 5,140,509 A | | 8/1992 | Murugan .................. 363/17 |
| 5,172,009 A | * | 12/1992 | Mohan .................. 307/46 |
| 5,222,664 A | * | 6/1993 | Noakes et al. .................. 239/3 |
| 5,343,494 A | * | 8/1994 | Averst et al. .................. 375/1 |
| 5,345,235 A | * | 9/1994 | Babcock .................. 341/139 |
| 5,451,933 A | * | 9/1995 | Stricklin et al. .................. 340/825.06 |
| 6,522,048 B1 | * | 2/2003 | Burns et al. .................. 310/316.01 |

OTHER PUBLICATIONS

Richard M. Haas, "Maintaining DC Power Bus Levels With A New Bi–Directional DC–DC Converter Technique", Proceedings of Powercon 8, 1981, pp. 1–8 no month provided.
Venkatesan, "Current Mode Controlled Bidirectional Flyback Converter" IEEE Power Electronics Specialists Conference, 1989, pp. 835–842 no month provided.
Himmelstoss et al., "Analysis Of The Closed–Loop Control Behavior Of A Bidirectional High–Frequency DC–DC–Converter", PCIM'88 Proceedings, pp. 174–184 no date provided.
Chu et al., "A Steady–State Model Of Bidirectional UPS for Parameter Design", INTEL'91 (Nov. 1991), pp. 459–465.
Severns et al., "Modem DC–To–DC Switchmode Power Converter Circuits", Van Nostrand Reinhold Electrical–Computer Science and Engineering Series, 1985, pp. 9, 16 no month provided.

* cited by examiner

*Primary Examiner*—Fritz Fleming (57) ABSTRACT

AS uninterruptible power supply (UPS) is disclosed in which AC line power is used to charge back-up battery and to operate a load during a stand-by mode of operation of the UPS. In the back-up mode of operation when AC line power is not available, the battery is used to supply power to the load. The UPS is implemented with only one inexpensive high frequency transformer and a single bi-directional power converter. Thus, the UPS of the present invention is lower in cost and complexity than such UPSs known in the prior art.

US 5,440,179 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

Claim 7 is cancelled.

Claim 8 is determined to be patentable as amended.

Claims 9, 10 and 11, dependent on an amended claim, are determined to be patentable.

8. An uninterruptible power supply according to claim [7] 5, *wherein said control means further includes second pulse width modulation means for generating a series of second control pulses for controlling the operation of said second switch means, said second pulse width modulation means being coupled to said storage capacitor, wherein the duty cycle of said second control pulses is dependent on the level of voltage across said storage capacitor, and* wherein said control means further includes sequencer means for enabling and disabling said first and second pulse width modulation means in accordance with the level of the AC input voltage, the voltage across said battery and the voltage across said storage capacitor.

* * * * *